United States Patent
Denison et al.

(10) Patent No.: US 12,316,722 B2
(45) Date of Patent: May 27, 2025

(54) WIRELESS PROTOCOL CONVERTER FOR FIELD DEVICES

(71) Applicant: FISHER-ROSEMOUNT SYSTEMS, INC., Round Rock, TX (US)

(72) Inventors: David R. Denison, Austin, TX (US); Manikandan Janardhanan, Cedar Park, TX (US); Fred G. Middendorf, Eagan, MN (US); Scott N. Hokeness, Lakeville, MN (US); Nicholas T. Meyer, Fayetteville, GA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 55 days.

(21) Appl. No.: 16/587,653

(22) Filed: Sep. 30, 2019

(65) Prior Publication Data

US 2020/0106864 A1 Apr. 2, 2020

Related U.S. Application Data

(60) Provisional application No. 62/739,830, filed on Oct. 1, 2018.

(51) Int. Cl.
*H04L 69/08* (2022.01)
*G05B 19/418* (2006.01)
(Continued)

(52) U.S. Cl.
CPC .......... *H04L 69/08* (2013.01); *G05B 19/4185* (2013.01); *G06F 13/387* (2013.01);
(Continued)

(58) Field of Classification Search
CPC ..... H04L 69/08; H04L 29/06; G05B 19/4185; H04W 88/10
See application file for complete search history.

(56) References Cited

U.S. PATENT DOCUMENTS

| 5,870,626 A | 2/1999 | Lebeau |
| 7,460,865 B2 | 12/2008 | Nixon et al. |

(Continued)

FOREIGN PATENT DOCUMENTS

| CN | 102883468 A | 1/2013 |
| CN | 105491005 A | 4/2016 |

(Continued)

OTHER PUBLICATIONS

Search Report for Application No. GB1913830.4, dated Feb. 25, 2020.
(Continued)

*Primary Examiner* — Chae S Lee
(74) *Attorney, Agent, or Firm* — MARSHALL, GERSTEIN & BORUN LLP

(57) ABSTRACT

Techniques for accessing and controlling field devices to collect data and convert protocols include receiving data encoded in a process control protocol, extracting a payload, storing some of the payload, and transmitting some of the payload in a general-purpose computing communication protocol via a wireless network. A method of accessing a field device includes receiving a command of a user from a user communicator, identifying a target field device, generating a command, encoding a protocol-encoded data set, and transmitting the protocol-encoded data set to the target field device. A field communicator device includes instructions for retrieving and interpreting field device data, storing the data, and transmitting the data. A computing system includes a field communicator, wireless user communicator, and a wireless computer network for accessing and controlling field devices in a process plant.

22 Claims, 6 Drawing Sheets

(51) Int. Cl.
  *G06F 13/38* (2006.01)
  *H04L 9/40* (2022.01)
  *H04W 88/10* (2009.01)
(52) U.S. Cl.
  CPC ............... *H04L 9/40* (2022.05); *H04W 88/10* (2013.01); *G05B 2219/31121* (2013.01); *G05B 2219/31162* (2013.01); *G05B 2219/31369* (2013.01); *G05B 2219/33192* (2013.01)

(56) References Cited

U.S. PATENT DOCUMENTS

| | | | |
|---|---|---|---|
| 9,454,744 | B2 | 9/2016 | Imming et al. |
| 2002/0099842 | A1 | 7/2002 | Jennings et al. |
| 2006/0192671 | A1* | 8/2006 | Isenmann ............ G05B 19/042 340/531 |
| 2007/0280144 | A1* | 12/2007 | Hodson ................. H04L 69/08 370/312 |
| 2008/0273486 | A1 | 11/2008 | Pratt et al. |
| 2010/0145476 | A1* | 6/2010 | Junk ..................... G05B 19/042 700/7 |
| 2012/0236768 | A1* | 9/2012 | Kolavennu ............ H04L 69/08 370/310 |
| 2013/0295859 | A1* | 11/2013 | Parent .................... H04L 67/12 455/73 |
| 2014/0355581 | A1* | 12/2014 | Pulini .................... H04L 67/12 370/338 |
| 2015/0081922 | A1* | 3/2015 | Brett ................. H04L 12/40091 709/230 |
| 2016/0043866 | A1* | 2/2016 | Nixon .................. G05B 19/418 713/168 |
| 2016/0100437 | A1* | 4/2016 | Armstrong ......... G05B 19/4185 370/249 |
| 2017/0270295 | A1* | 9/2017 | Park ...................... G06F 21/552 |
| 2017/0359675 | A1* | 12/2017 | Gopalakrishnan ...... H04L 69/08 |
| 2017/0369675 | A1 | 12/2017 | Park |
| 2018/0091491 | A1 | 3/2018 | Osa et al. |

FOREIGN PATENT DOCUMENTS

| | | |
|---|---|---|
| CN | 105681179 A | 6/2016 |
| EP | 2 852 103 A1 | 3/2015 |
| EP | 3 255 906 A1 | 12/2017 |
| GB | 2 532 579 A | 5/2016 |
| JP | 2005-51746 A | 2/2005 |
| JP | 2013-55662 A | 3/2013 |
| JP | 2014-514635 A | 6/2014 |
| KR | 10-1813067 B | 12/2017 |
| WO | WO-2017/202675 A1 | 11/2017 |

OTHER PUBLICATIONS

Examination Report for Application No. GB1913830.4, dated Oct. 21, 2022.
Office Action and Search Report for Chinese Patent Application No. 201910943668.2, dated Oct. 21, 2022.
Combined Search and Examination Report for United Kingdoms Application GB2219758.6, dated Feb. 14, 2023.
Combined Search and Examination Report for United Kingdoms Application GB2219759.4, dated Feb. 14, 2023.
Final Rejection for Japanese Application No. 2019-177731, dated Apr. 23, 2024.
Decision of Rejection for Chinese Application No. 201910943668.2, dated Dec. 26, 2023.
Examination Report for Application No. GB2219758.6, dated Jun. 16, 2023.
Notice of Reasons for Rejection for Japanese Application No. 2019-177731, dated Aug. 8, 2023.
Second Office Action for Chinese Patent Application No. 201910943668.2, dated Apr. 27, 2023.
Third Office Action for Chinese Patent Application No. 201910943668.2, dated Aug. 31, 2023.

* cited by examiner

WIRELESS PROTOCOL CONVERTER FOR FIELD DEVICES

CROSS-REFERENCE TO RELATED APPLICATIONS

The priority benefit of U.S. Provisional Patent Application No. 62/739,830, filed Oct. 1, 2018, is claimed and the entire contents thereof are incorporated by reference herein.

TECHNICAL FIELD

The present disclosure generally relates to process plants and process control systems, and more particularly, to providing data collection and data protocol conversion facilities for a field device within a process plant.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices and controllers are generally referred to as "process control devices."

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Generally, the data highway or communication network is a low-bandwidth wired network. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Typically, a process plant requires physical devices, connections, wiring, etc. to be installed, set up, and interconnected in the field environment of the process plant via physical wiring. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices via wired connections.

Typically, field devices are accessed by different categories of users. For example, control engineers may program field devices using workstations located in the back-end environment of the plant. Operations users may monitor field devices for operational statuses, trends (e.g., value thresholds), control loop performance, etc. Maintenance users may also access various devices in a process plant to repair, reconfigure, replace and/or maintain the devices on a routine and/or emergency basis. Each of the users may access the field devices through connections to the field devices which may be direct connections facilitated by a handheld or portable communicator device or via installed process plant networks. Field devices may produce a large volume of data that saturates the hard-wired network in a process plant and communicating directly with handheld devices can be tedious and time consuming as it generally requires a temporary direct hardwired connection to the field device. In addition, data from field devices that is received via an installed hard-wired network of the process plant will be delayed due to the need to traverse a series of hops within the hard-wired network. Moreover, because diagnostic data from field devices may not be associated with the primary purpose of the field device within the process plant, this data may be deprioritized with respect to data concerning the plant's primary functions. Such deprioritized data may cause significant delays in troubleshooting, upgrading, and maintaining field devices.

Moreover, some activities (e.g., diagnosing a field device) may require a user (e.g., a maintenance user) to physically access the field device, resulting in an array of complications. First, the user may need to remove a cover of the field device to access the communication terminals of the field device and, during this process the innards of the field device may be exposed to a potentially hazardous plant environment (e.g., combustible gases, toxins, exhaust, heat, sparks, arc flash, etc.). Additionally, accessing the field device may require the user to remove and/or replace a housing of the field device, potentially exposing the field device to contamination and/or voiding a certification of the field device and mandating that the user replace various disposable hardware components as a result of accessing a field device (e.g., a rubber gasket, an O-ring, etc.). The field engineer must therefore carry extra replacement hardware to the field device each time the user performs maintenance, increasing the physical burden on the field engineer/user.

SUMMARY

A computer-implemented method of collecting data from a field device and for performing protocol conversion includes receiving a data set encoded in a process control protocol from the field device via a transmitter. The transmitter may be wired or wireless. The method may further include extracting a payload from the data set via a processor and storing at least some of the payload in a memory, and transmitting at least some of the payload encoded in a general-purpose computing communication protocol via a wireless network interface controller.

In another aspect, a computer-implemented method of accessing a field device includes receiving a command of a user including an indication of a field device in a field communicator device, the command of the user including the indication of the field device received from a user communicator. The method may further include identifying a target field device including a protocol corresponding to the target field device, based on the indication of the field device, and generating a device command based on the command of the user. The method may further include encoding a protocol-encoded data set based on the protocol corresponding to the target field device and transmitting the protocol-encoded data set to the target field device via a transmitter.

A field communicator device comprises one or more processors, a transmitter, a wireless network interface controller, and memory storing computer-executable instructions that when executed by the one or more processors, cause the field communicator device to retrieve data encoded in a process control protocol, interpret the data in the wireless communication device, store at least some of the data in the memory, and transmit at least some of the data in a general-purpose computing communication protocol via the wireless network interface controller.

A computing system for providing data collection and protocol conversion techniques includes a wireless computer network, a wireless user communicator; and a field communicator comprising one or more processors, a transmitter, a wireless network interface controller, and a memory storing instructions that, when executed by the one or more processors, cause the computing system to transmit data encoded in a process control protocol via the wireless computer network. The memory may include further instructions that, when executed by the one or more processors, cause the computing system to receive the data via the wireless network, interpret the data to generate a data payload in the field communicator, and issue an instruction to a field device including the data payload.

DETAILED DESCRIPTION

Figure 1:
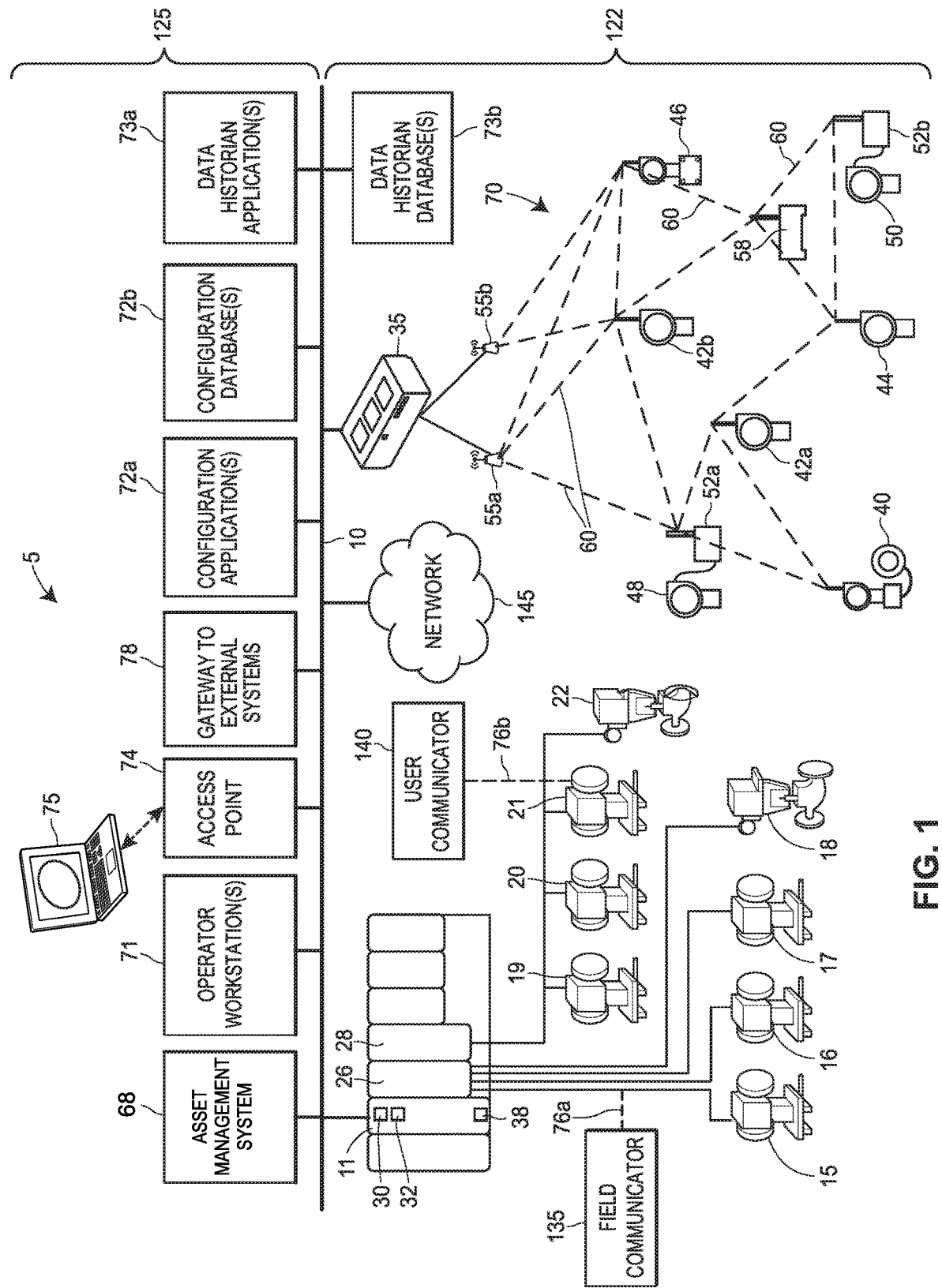
FIG. 1 depicts a block diagram illustrating an example process plant and components thereof, at least a portion of which may include the data collection and protocol conversion techniques described herein.

Process plants generally include a plurality of devices of different types, which monitor various aspects of processes within the process plant, to ensure that the systems and components of the plants are designed, tested, installed, operated, and maintained according to the operational requirements of the owners or clients, thus guaranteeing the operability, performance, reliability, safety, and information traceability of the process plants.

The devices of different types may include field devices such as HART®, WirelessHART®, and FOUNDATION® Fieldbus field devices. Each of the field devices may be hard-wired into a computer network that is communicatively coupled to a variety of back-end services (e.g., a management system, a workstation, a database, etc.), permitting users (e.g., employees of the process plant) to monitor, configure, access, and deploy the field devices. In certain aspects, field devices may be accessed via one or more controllers. Generally, a "process control device," "control device," or "field device" may be any device within the plant environment, including control devices, safety devices, monitoring devices, and/or the like, that may be configured to initiate, implement, and/or manage functionalities associated therewith.

A process plant may include a field device coupled to a field communicator device, wherein the field communicator is wirelessly accessible via a user communicator. Generally, a user may access the field communicator using the user communicator, to orchestrate the reading of data from, and the writing of data to, the field device. For example, the user may use the user communicator to issue a command. The command may be transmitted from the user communicator to the field communicator in a general-purpose computing communication protocol (e.g., Hyper Text Transfer Protocol). The field communicator may receive the command, convert the command to a process control protocol command, and transmit the converted command to the field device. The field communicator may read a response of the command, and transmit the response to the user communicator. In general, any suitable form of transitive bidirectional communication may be implemented between the field device, the field communicator, and the user communicator.

The field communicator may facilitate certain capabilities of the field device that are otherwise lacking in the field device (e.g., data collection, data caching, data conversion routines, wireless transmission capabilities, etc.). The field communicator may be installed in conjunction with the field device by the manufacturer of the field communicator (e.g., at the time of the fabrication of the field device) or by the purchaser/user of the field device. For example, a process plant operator may acquire a field device and a field communicator, together or separately, and the plant operator may install the field communicator into the field device before deploying the field device into the process plant. A user communicator may be provided with the field communicator or separately. Alternately, or in addition, the plant operator may obtain a field communicator and install the field communicator into an existing deployed field device (i.e., retrofit/upgrade an existing field device).

The field device may be linked to the field communicator (e.g., by a wired or wireless connection) and the field communicator may read data from the field encoded in a process control protocol. The field communicator may convert that process control protocol-encoded data into a general purpose computing communication protocol. The field communicator may cache the original and/or converted data in short- or long-term memory. The field communicator may transmit the converted data to another device in the process plant (e.g., a router, a repeater, a device within a wireless mesh network, etc.) via a wireless network interface controller of the field communicator.

Typically, process control protocol data from field devices is only available within a process plant via a low bandwidth wired environment. However, because the field communicator may be directly linked to the field device via a wired connection, the field communicator may retrieve data from the field device at high bandwidth/throughput rates (e.g., 1 gigabyte per second or more) and may retrieve large volumes of data from the field device relatively quickly, as compared to the traditional low bandwidth access to field device data. Furthermore, because the field communicator may include a wireless network interface card linked to a high-speed wireless network, the field communicator may facilitate real-time high-speed access to field devices by any other devices in the process plant that have traditionally lacked such access. For example, the field communicator may wirelessly exchange data with other field communicators, with stationary components within the process plant, and/or with mobile components (e.g., a user communicator) within or proximate to the process plant.

The field communicator may standardize access to field devices having disparate process control protocols (e.g., via an Application Programming Interface (API)). For example, a given field device may emit data in a packet-based format, a packed binary format, etc. The format may be proprietary to a field device manufacturer, and may not be backwards-compatible between devices. The field communicator may include a library of protocol conversion routines that allow the field communicator to facilitate transparent and standardized access to field devices having disparate process control protocols. For example, a field communicator could be installed in three respective field devices manufactured by different manufacturers, which emit data in three different respective process control protocols. Furthermore, each of the three field devices may include three respective sets of functionality, wherein there is some overlap. For example, each of the three devices may support a version command, which when executed, returns the software version of the respective field device. However, the commands that must be issued to the respective devices to obtain the version may be distinct.

In the above example, a user may access the field communicator using the user communicator via the API of the field communicator. For example, the user may issue, e.g., a GetVersion command. One or more field devices may be provided as parameters to the GetVersion command. Software instructions executing in the field communicator may determine an appropriate system call, based on the identity/type of the field device provided as a parameter. In the above example, the field communicator may issue three different version commands to each of the respective field devices. One benefit of this unified interface to disparate field devices is that the user's programming task is simplified. The user only must write one query, instead of three. The library of protocol conversion routines is a helpful black box abstraction. A further benefit of the field communicator API is that multiple field devices may be queried in parallel, via multi-threaded and/or multiprocessor code. Further benefits are envisioned.

For example, regardless of how a particular field device becomes equipped with field communicator capabilities, a field device so equipped gains a number of important and beneficial uses in the context of the process plant, including without limitation, the ability of the plant operator to remotely administer the field device, the ability to segregate data from one or more field device into separate networks (e.g., for security and/or load management purposes) and the elimination of the mandate of direct physical access to field devices once deployed. Accordingly, an administrator of a process plant may efficiently and effectively administer field devices without exposing the administrator or the field device to potentially hazardous conditions. Large volumes of data may be read from and written to the memory of the field device in real-time, or near real-time, without disrupting the network priority of other data transmitted within the process plant. The systems and methods may allow field devices to be more efficiently provisioned/commissioned, and may allow data to be cached in the memory of the field communicator, allowing certain attributes of the field device (e.g., software version, last calibration date, etc.) to be more quickly retrieved.

The systems and methods may further enable the administrator to initiate corrective action and/or other functionalities related to collecting data from field devices, and transforming data to and from certain protocols. For example, a user may be in the field environment of a process plant, and may notice via visual inspection that a valve appears to be stuck. Historically, the user would need to physically access the field device associated with the valve, and the user may first need to retrieve a process control protocol-specific piece of hardware to perform a diagnostic. Even if the user had the correct hardware, the user may need to refer to documentation of an unfamiliar process control protocol, which may be very time-consuming. However, using the present techniques, the user may use the user communicator to access the field device immediately, whereupon the user may access the cache of the field device to determine the current state of the valve (e.g., using a GetValveState command), as well as a snapshot of historical valve states. This data may be presented to the user via a graphical user interface, allowing the user to quickly intuit that the state of the valve has been stuck in a particular position for a long time.

In the above example, a user accesses the field communicator via a user communicator. However, in the context of the invention, the field communicator may be configured to automatically (e.g., periodically) execute commands, retrieve data from the field device, transmit data to the network, etc. without the explicit intervention of a user. Also, multiple users may access the field communicator simultaneously, using one or more general-purpose computing communication protocol. For example, a first user may access the field communicator via a hand-held user communicator via Bluetooth, while a second user accesses the field communicator via an HTTP connection from a high-performance computing device.

FIG. 1 is a block diagram of an example process plant, process control system, or process control environment 5 in which one or more field communicators as described herein may be installed and operate. The process control environment 5 includes one or more process controllers that may receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, etc.) to control the operation of a process, and some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In an embodiment, the controller 11 is communicatively connected to the wireless gateway 35 using one or more communications networks other than the backbone 10, such as by using any number of other wired or wireless communication links that support one or more general-purpose computing communication protocols (e.g., Wi-Fi or other IEEE 802.11 compliant wireless local area network protocol, a mobile communication protocol (e.g., WiMAX, LTE, or other ITU-R compatible protocol), Bluetooth®, etc.) or a process control protocol (e.g., HART®, WirelessHART®, Profibus, FOUNDATION® Fieldbus, etc.).

The controller 11, which may be, by way of example, the DeltaV™ controller sold by Emerson Process Management, may operate to implement a batch process or a continuous process using at least some of the field devices 15-22 and 40-46. In addition to being communicatively connected to the process control data highway 10, the controller 11 may also be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM) Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26 (also referred to herein as "non-smart" or "dumb" devices), while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or more operator workstations 71 that are communicatively connected to the data highway. Via the operator workstations 71, operators may view and monitor real-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The process control system 5 includes an asset management system 68 configured to facilitate certain of the functionalities discussed herein. The asset management system 68 may interface and communicate with a portion or all of the field devices 15-22 and 40-46, such as via the process controller 11 and/or the wireless gateway 35. According to embodiments, the asset management system 68 may request and retrieve, from the field devices 15-22 and 40-46, data associated with the field devices 15-22 and 40-46.

The asset management system 68 may generally include one or more software applications executing on one or more workstations (such as the operator workstation(s) 71) to enable a user to review data associated with the field devices 15-22 and 40-46 of the process control system 5. Such interaction may include diagnostics, maintenance, configuration, assessment, and/or the like. While the workstation(s) may have one or more asset management system applications running locally, a user may interface with the asset management system 68 remotely via a data communication network. Thus, a user located at the workstation(s) may interact with the asset management system 68 in order to facilitate various functions related to the process control system 5 regardless of the physical location of the user.

The example process control system 5 is further illustrated as including a configuration application 72a and configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72b stores the created (e.g., configured) modules and/or operator interfaces. Additionally, the configuration database 72b stores a set of defined or baseline parameters associated with any of the field devices 15-22, 40-46. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5.

The example process control system 5 includes a data historian application 73a and data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, I/O devices 26, 28, or wireless devices 35, 40-58) also communicate using the wireless protocol supported by the access points 74.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote. As discussed above, the present techniques are intended to improve the frequency and data collection ability on field devices, applying to all process, energy, and discrete industries. Whereas human operators/employees of the process plant 5 have historically needed to enter the harsh, unshielded environment of the field environment 122 for data collection purposes, the present techniques improve the speed and access of data transmission from field devices to asset management systems (e.g., asset management system 68).

As discussed herein, the configuration database(s) 72b may be disposed in the back-end environment 125 of the process plant 5, and may be used for data collection purposes. The configuration database(s) 72b may store, inter alia, data and other information that specifically identifies and/or addresses the various devices or components and their interconnections that are planned for or desired to be implemented on the process plant floor or field environment 122. Some of this data may be provided to components in the field environment 122 for use in configuration, monitoring, and/or diagnostics of devices and loops therein, and some of this data may be utilized in the back-end environment 125, e.g., for the design, development, and preparation of control modules and/or operator interface modules that will operate in conjunction with the field environment 122 during live operations of the process plant 5.

The example process control system 5 may also include one or more field communicators 135 coupled to one or more user communicators 140 by a network 145. Users of the process plant are interested in obtaining data produced by field devices, and in controlling the field devices remotely. In a preferred embodiment, the field communicator 135, the user communicator 140, and the network 145 are used in concert to facilitate such access. Generally, the field communicator 135 mediates bidirectional electronic communication between field devices and other components of the process plant. Generally, the field communicator 135 functions as a receiver of data, protocol converter, and/or transmitter of data, to enable users to perform various functions related to the access, configuration, and control of field devices.

The field communicator 135 may be a loop- and/or field-powered hardware extension that is coupled to a device (e.g., any field device such as a transmitter, control valve, etc.) via physical wiring or via a wireless connection. For example, the field communicator 135 may be coupled to the wired field device 17 by a 2-wire, 3-wire, or 4-wire transmitter. On the other hand, the field communicator 135 may be battery powered or have an independent power source.

The field communicator 135 may be installed on existing or new intelligent field devices. A field device may be retrofitted/upgraded to include the field communicator 135 by removing an existing cover of a legacy field device to expose a conduit/channel through which the wire transmitter may be passed to join, by wire, terminals of the field device to terminals of the field communicator 135. The wiring of field devices to the field communicator 135 is discussed in more detail below. It should be appreciated that once the field communicator 135 is installed in or on the field device, field device data may be retrieved from the field device without opening the cap or cover of the field device.

The field communicator 135 may obtain (i.e., receive and/or retrieve) encoded data from field devices via a wired or wireless connection. For example, and without limitation, the field communicator 135 may obtain data encoded in the HART protocol, the Foundation Fieldbus protocol, the Profibus protocol, and/or the Modbus protocol, as examples, from process control devices (e.g., field devices). The field communicator 135 may include a library of executable instructions, code, functions, routines, etc. which enable the field communicator 135 to obtain the data from various field devices.

In addition to obtaining encoded data from field devices, the field communicator 135 may perform protocol conversion of encoded data obtained from field devices. The data may be encoded in a process control data protocol. Specifically, the field communicator 135 may translate from a process control data protocol (e.g., HART) to a general purpose computing communication format (e.g., XML, JavaScript Object Notation, etc.), and vice versa, using a library of device-specific protocol conversion routines.

In addition to obtaining encoded data and performing protocol conversion, the field communicator 135 may transmit (i.e., send and receive) data via a general-purpose computing communication protocol. For example, the field communicator 135 may send the data formatted in a general-purpose computing communication format to another host on the network 145 (e.g., the user communicator 140) via a general-purpose computing communication protocol such as WiFi (e.g., IEEE 802.11), Bluetooth, Bluetooth-Low-Energy, Long Range (LoRa), and/or a cellular mobile communications protocol (e.g., 4G, 5G, etc.). The field communicator 135 may also receive data formatted in a general-purpose computing communication format via a general-purpose computing communication protocol from another host on the network 145, such as the user communicator 140. The field communicator 135 may include one or more API to facilitate programmatic transmission of data formatted in a general-purpose computing communication format via the user communicator 140.

A user may use the user communicator 140 to access and/or control a field device. The user communicator 140, which may include any suitable computing device, such as a desktop computer, laptop computer, a tablet or handheld smart device, a wearable computing device, etc., may include computer-executable instructions for performing a set of functions with respect to the field communicator. Those functions include transmitting (e.g., send and receive) information to and from the field communicator 135 via the network 145. The user communicator 140 may relay field device data to the asset management system 68 via a computer network, such as a wired network or the network 145. The user communicator 140 may include a set of client API bindings for issuing calls to the one or more API of the field communicator 135 via the network 145.

The network 145 may be an IEEE 802.11 compliant wireless local area network, ad-hoc network, mesh network, a personal area network, mobile telecommunications network such as a 3G or 4G network; a wireless local area network (WLAN), satellite communication network, terrestrial microwave network, or any other suitable wireless network. The network 145 may communicatively couple the field communicator 135 and the user communicator 140. The network 145 may provide a communication link between the field communicator 135 and other aspects of the field environment 122, such as the operator workstation 71. In some cases, access of the field communicator 135 to aspects of the back-end environment 125 may be mediated by the wireless gateway 35.

In operation, a process plant user may desire to access a field device for the purpose of obtaining information or controlling the field device. For example, a user may seek to know the status of a sensor associated with the field device (e.g., a valve), or the user may seek to change the state of valve (e.g., open or close the valve). The user may access a display or user interface of the user communicator 140. The user communicator 140 may cause a command encoded in a general-purpose computing communication format (e.g., XML) to be sent to the field communicator 135 via a general-purpose computing communication protocol (e.g., HTTPS), including an indication of the user's desire (e.g., GetValveStatus), and one or more parameters. The user communicator 140 may use client API bindings to send the command and parameters (collectively, API call), and the API of the field communicator 135 may receive the API call.

The field communicator 135 may translate the API call from the user communicator 140 using the library of protocol conversion routines into a field device command encoded in a process control protocol. Which particular process control protocol is used may depend on an indication included in the API call (e.g., a list of field device names/identifiers). In cases where only one type of field device is connected to the field communicator 135, the type of process control protocol may be selected automatically by the field communicator 135. Alternately, the field communicator 135 may query field devices to determine their types, and select a suitable protocol based on the types.

Once the field communicator 135 has translated the API call into the field device command, the field communicator 135 may issue the field device command to one or more field devices. The field communicator 135 may then synchronously and/or asynchronously read a response from the one or more field devices. In some cases, the client API bindings may include a flag or different function calls for performing synchronous and/or asynchronous operations. Next, the field communicator 135 may convert the response from the field device relating to the field device command into a general purpose computing communication format, and transmit the response back to the user communicator 140 via the network 145, whereupon the response may be processed further, displayed to the user, etc.

It should be appreciated that users may seek many different types of access to and control over field devices, and that many operations are supported by the API of the field communicator 135 and the client API bindings of the user communicator 140. For example, a user located at the operator workstation 71 may use the user communicator 140 to modify the configuration of the wired field device 17 without leaving his desk. A user may configure a device to programmatically access the field communicator 135. For example, a user communicator 140 or another device (e.g., a server device) may be programmed to automatically retrieve data from one or more field devices via the field communicator 135 on a predetermined schedule (e.g., each day at 4:00 A.M.). A user may cause the field communicator 135 to issue a command having the effect of engaging a sensor in the field device (e.g., the API may include a RunPartialStrokeTest command). Many additional uses for remote administration of the field communicator 135 and/or field devices by a user accessing the user communicator 140 are envisioned. A user may configure the field communicator 135 to automatically collect data and transmit the data to the asset management system 68.

Furthermore, alternate protocol conversion configurations are possible. For example, the response from the field device may be only partially converted prior to transmission to the user communicator 140. For example, the field communicator 135 may have limited processing capabilities, or more in-depth processing may be necessary. In that case, data obtained from field devices may be transmitted in translated and/or untranslated form. The field communicator 135 may include a mode in which data obtained from a field device is sent uninterpreted to another computer (e.g., to a user interface device 75) for further processing.

Moreover, although the above examples describe a wired connection between the field communicator 135 and the field device, wireless connections are possible. For example, a WirelessHART field device may transmit data via a wireless connection to the field communicator 135. In this case, the field communicator 135 may be a standalone device that does not receive power via a wired connection to a field device. The field communicator 135 may proxy communications in one protocol (e.g., HART) from the WirelessHART device to another location (e.g., by transmitting the HART-encoded data).

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5. Although only one field communicator 135 and one user communicator 140 are depicted, any suitable number of each may be deployed in the field environment 122. Although only one network 145 is depicted, any number of suitable networks may be developed and deployed. For example, a first network 145 may be used for inter-field device communication, whereas a second network 145 may be used for communication from the field device 135 to the configuration application 72a. The field communicator 135 may join the first network 145 and the second network 145 simultaneously.

The benefits of the above-described techniques are many. First, field devices may be accessed and controlled more efficiently. Historically, field devices may pass diagnostics using native protocols, which are slow and may only be used intermittently. For example, data passed from a field device directly to the asset management system 68 via the backbone 10 may first pass through an automation system, thus introducing a layer of communication resulting in latencies and/or bandwidth constraints, and preventing the asset management system 68 from receiving real-time diagnostic information from the field devices. By including additional wireless networks, bandwidth is amplified.

Second, hardware is utilized more efficiently, lowering costs. In some cases, the field communicator 135 may be optimized via store and forward on exception to the asset management system 68. For example, the asset management system 68 may be inherently limited in the number of field devices with which the asset management system 68 may communicate in a given window of time. By adding the field communicator 135 to the field environment 122, the field communicator 135 polls an associated device (e.g., a field device that the field communicator 135 is wired to) more frequently for data, and then stores/forwards that data to the asset management system 68 via the wireless gateway 35 or another computer network. By the field communicator 135 asynchronously pushing data to the asset management system 68 in this way, resources within the process plant 5 that would otherwise be needed to initiate polling of the field device are freed for other tasks, thereby reducing overall load. Insofar as overall load is reduced, the asset management system 68 can accommodate a larger scale of devices communicating more frequently.

Third, users may access and control field devices more conveniently in a way that is safer for the users and the devices. A user located in the back-end environment 125 may, without leaving the back-end environment 125, configure and/or calibrate the field communicator 135 via the user communicator 140 and/or network 145, without opening an end cap of a field device and without exposing the electronics located therein. For many tasks, including configuration, a user is required to open the device housing of the process monitoring sensor (e.g., remove the housing of a field device) to physically connect the user communicator 140 to the process monitoring sensor to communicate with the process monitoring sensor. The user may be required to replace the housing when the user is finished working with the field device. Opening a field device is time-intensive, can damage aspects of the field device (e.g., an O-ring, hinge, and/or packing), can void hazardous area certifications of the field device, and can expose the sealed inner workings of the field device to contaminants. However, a user can use the user communicator 140 and the network 145 to achieve remote access and control over a field device that has historically required direct physical access to the device.

Fourth, the need for specific automation-specific interfaces in the asset management system 68 may be eliminated. Any hardware and/or logical resources currently devoted to the collection of data from field devices and the conversion of that data may be released and/or reallocated.

Fifth, the field engineer or maintenance user's physical demands are lessened. Because the present techniques enable remote administration of field devices, such users no longer need to carry large amounts of hardware with them in order to service field devices in the field. Furthermore, the unified user communicator 140, which can access any field device, allows the field engineers to reduce the amount of computing hardware that they need if they are required to service a field device in the field environment 122.

Figure 2:
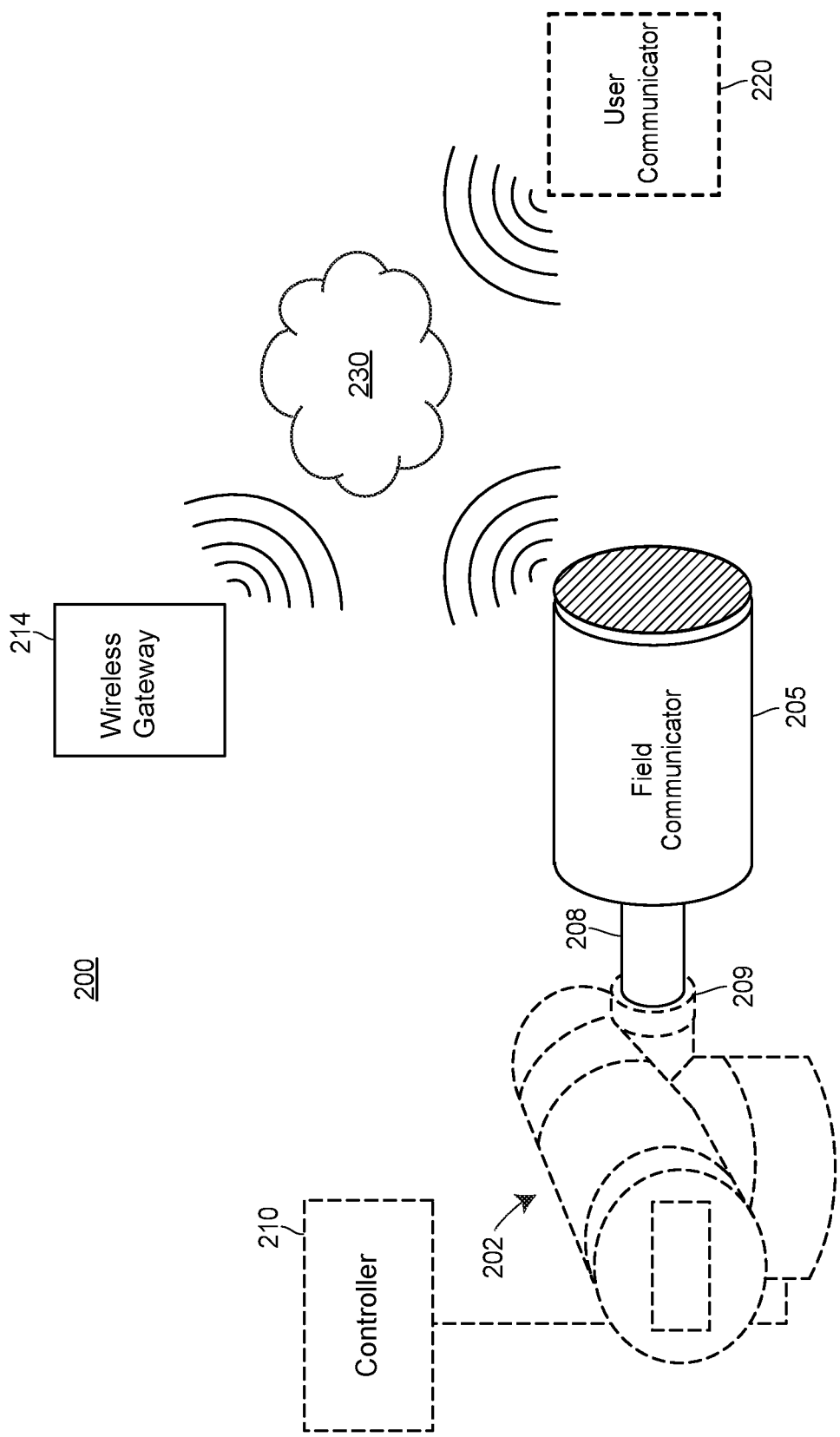
FIG. 2 depicts an example process plant environment for performing data collection and protocol conversion techniques.

FIG. 2 illustrates an example environment 200 in which a field device 202 coupled to a field communicator 205 may be deployed and used. Generally, the field device 202 may correspond to one of the field devices depicted in FIG. 1 (e.g., one of wired field device 15-18, one of field devices 19-22, etc.). The field communicator 205 may correspond to the field communicator 135, for example. In operation, the field device 202 may be installed and/or configured to include the field communicator 205. The field device 202 and field communicator 205 may be coupled by a conduit 208. The conduit 208 may include a plug 209. The plug 209 may be a plug existing in field devices (e.g., the field device 202) which may be removed by a user to allow additional components, such as the field communicator 205, to be attached/joined to the existing field device 202 via the conduit 208 (e.g., by snaking wires through the conduit 208).

The environment 200 may also include a controller 210 to which the field device 202 is communicatively coupled. The controller 210 may correspond to the controller 11 of FIG. 1, in some embodiments. The environment 200 may include a wireless gateway 214 and a user communicator 220, which may be communicatively coupled by a network 230. The wireless gateway 214 may correspond to the wireless gateway 35 of FIG. 1, and the user communicator 220 may correspond to the user communicator 140. The network 230 may correspond to the network 145.

In operation, the field device 202 may be deployed with, or retrofitted/upgraded to include, the field communicator 205. The field communicator 205 may be attached to the field device by way of the conduit 208. With respect to the field communicator 205, the conduit 208 may be a hollow tube of any suitable length, thickness, and diameter capable of being attached at a proximal end to the field communicator 205, and capable of being attached at a distal end to the field device 202. The attachment mechanism of the proximal end and/or the distal end may be any suitable attachment mechanism, such as a proprietary coupling, a threaded attachment point having a standard thread pitch, a friction seal, etc. The conduit 208 may include gaskets at either end in order to create an air- or watertight seal. As discussed in detail below, wiring laid within the conduit 208 may provide electric power to the field device 202 and the field communicator 205, and the same wires may be used to transmit data between the field device 202 and the field communicator 205.

Once the field device 202 and field communicator 205 are powered on, the field communicator 205/and or field device 202 may transmit data (e.g., in response to a polling operation) to the controller 210. As discussed with respect to FIG. 1, the field communicator 205 may also collect data from the field device 202, convert that data, and transmit converted data wirelessly via the wireless gateway 214 to and/or from the user communicator 220 over the network 230. For example, a user of the user communicator 220 may select one or more field communicator 205 via a user interface and then issue a configuration, calibration, maintenance, or other command. The command may be transmitted via the network 230 to the field communicator 205. In some cases, the command may be an API call including an HTTP request (e.g., a GET or POST request) having a payload. The payload may specify parameters. For example, a parameter may specify that the field communicator 205 is to instruct a particular field device to perform a particular function (e.g., initiate a short stroke test, transmit data, connect to a computer network, etc.). Based on the payload, the field communicator 205 may generate an instruction encoded for the particular protocol of the field device 202, and issue the instruction to the field device 202.

The field communicator 205 may include an API or other application for analyzing such command payloads and taking appropriate action when one is received from the user communicator 220. In some cases, the command may be transmitted via an authenticated and/or encrypted communication channel (e.g., authenticated HTTPS) to prevent eavesdropping and/or impersonation. As noted, the addition of the field communicator 205 to the field device 202 may allow the field communicator 205 to transmit data of the field device in real-time to other components of the environment, and to avoid overloading the controller 210, and to avoid saturating the network 230 or another network. Because the field device 202 may communicate via the network 230, which may be segregated from the default network (e.g., the backbone 10), data may be transmitted from the field device 202 without affecting the performance of the default network, and with low latencies (i.e., in real-time or near real-time).

Figure 3:
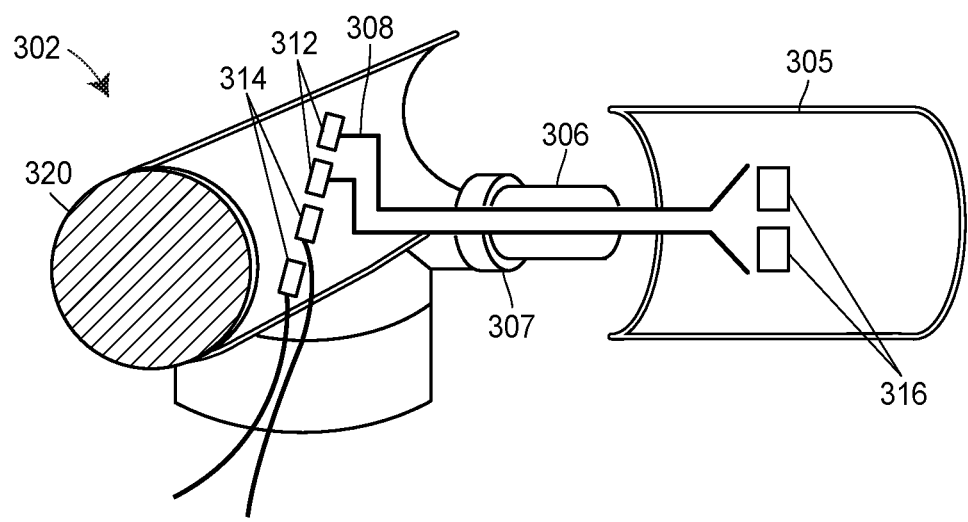
FIG. 3 depicts an example field communicator device capable of performing data collection and protocol techniques in a process plant.

FIG. 3 depicts a cutaway coupling 300 that is particularly configured to exchange data between a field device 302 and a field communicator 305 via a conduit 306. The field device 302 may correspond to the field device 202 of FIG. 1. The field communicator 305 may correspond to the field communicator 205. The conduit 306 may correspond to the conduit 208 of FIG. 1, and may include a plug 307, corresponding to the plug 209.

The cutaway coupling 300 may include an n-wired connection 308 between the field device 302 and the field communicator 305. Specifically, the connection 308 may be a 2-wire connection, 3-wire connection, or other wired connection using a suitable number of wires. The field device 302 may include one or more terminal/post 312, and one or more terminal/post 314. From the perspective of the field device 302, the proximal end of the connection 308 may be attached to the post 312 and the distal end of the connection 308 may be attached to the post 316. A technician or installer may attach the connection 308 to the post 312 by removing a cap 320 that is part of the field device. The cap 320 may be attached to the field device via a screw down mechanism, clip mechanism, etc. and may include sealing aspects such as O-rings or gaskets. The technician/installer may be able to manually remove the cap 320, or in some embodiments, removing the cap may require the use of a particular tool. The post 314 may include one or more wires that are linked to a controller.

Figure 4:
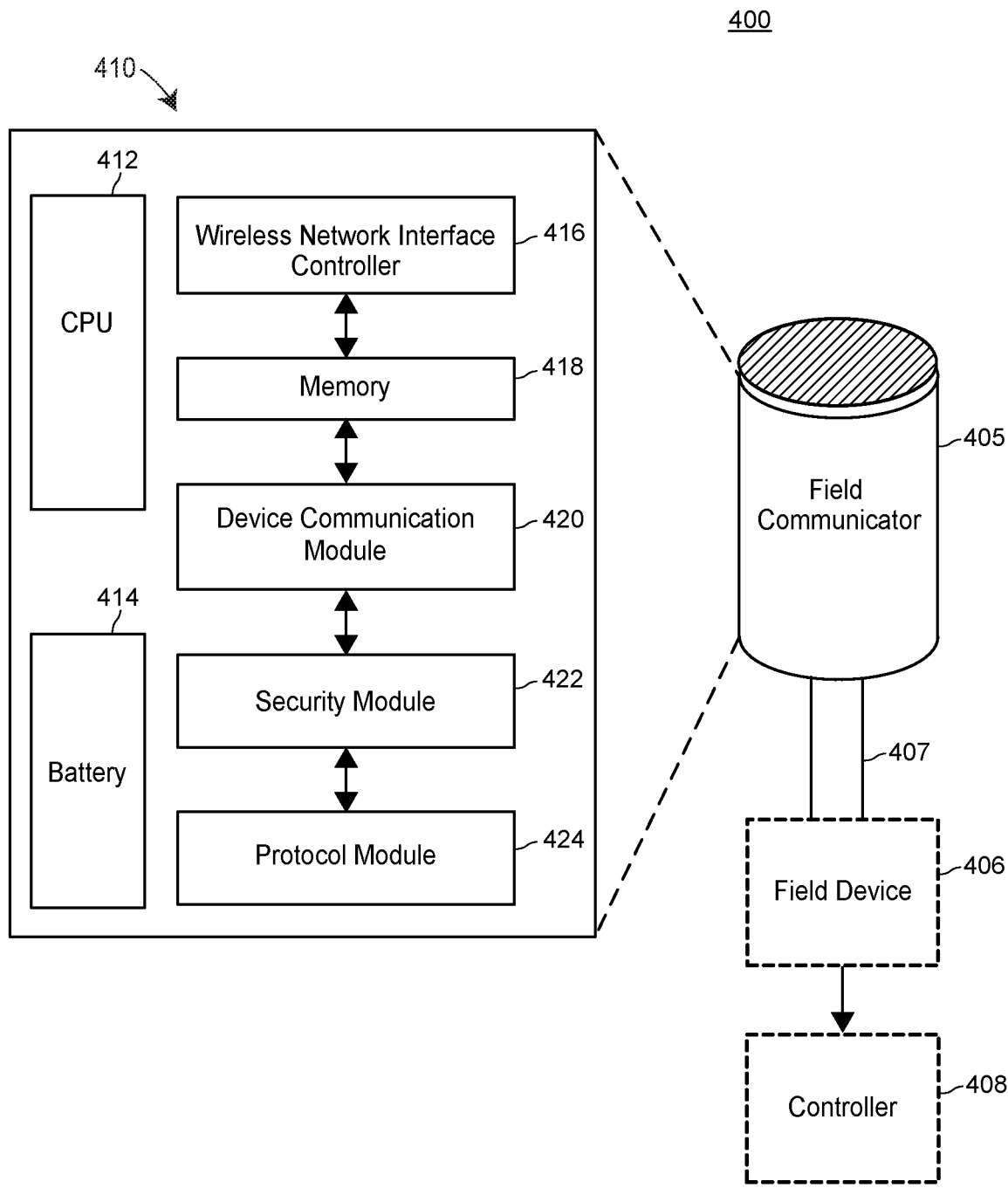
FIG. 4 depicts a block diagram illustrating an example field communicator device in communication with various components of a process plant.

FIG. 4 depicts an example computing device 405. The computing device 405 may correspond to the field communicator 135, the field communicator 205, and/or the field communicator 305. The computing device 405 may be coupled to a field device 406 via a conduit 407. The field device 406 may correspond to any of the field devices depicted in FIG. 1 (e.g., any of devices 19-22). The conduit 407 may correspond to the conduit 208 and/or the conduit 306. The field device 406 may also communicate with a controller 408, which may correspond to the controller 11 and/or the controller 210.

The computing device 405 may include a number of components, including a central processing unit (CPU) 412, a removable or replaceable battery 414, a wireless network interface controller (NIC) 416, a memory 418, a device communication module 420, a security module 422, and a protocol module 424. The CPU 412 may execute computer executable instructions. The battery 414 may hold a charge, which may allow the computing device 405 to continue to function (e.g., to continue to collect data) in the event of a power loss, in some embodiments, or which may provide primary power to the computing device 405. In some cases, the battery 414 may allow the deployment of the computing device 405 on a temporary basis. For example, the computing device 405 may be used for short-term deployment and/or monitoring scenarios. Many forms of ad-hoc use of the battery-powered computing device 405 are envisioned. Still further, the device 405 may have a battery cover that can be easily removed to replace the battery 414 in the field without needing to remove the cover of the field device to which the computing device 405 is connected. In some configurations, the CPU 412 is a multi-core processor or processor that has co-processing capabilities (e.g., quantum, cell, chemical, photonic, bio-chemical, biological processing technologies, and/or other suitable co-processing technologies). The CPU 412 may include one or more Graphics Processing Unit (GPU). It should be appreciated that although only one CPU 412 is shown in FIG. 4, the computing device 405 may include two or more CPU 412.

Although only one NIC 416 is depicted, the computing device 405 may include one or more NIC 416 via which one or more respective links to one or more respective communication or data networks are accessed. The one or more NIC 416 may include interfaces to one or more general-purpose computing communication and/or data networks, e.g., Bluetooth, Ethernet, NFC, RFID, Wi-Fi, etc. A link to a communication or data network may be as a memory access function, and/or a link may be a wired, wireless, or multi-stage connection. Many types of interfaces and links are known in the art of networking and may be used in conjunction with the computing device 405. Furthermore, the wireless NIC 416 may include one or more hardware and/or software network interfaces, such as Ethernet adapters and/or WiFi adapters. The wireless NIC may include any suitable hardware transmitter for receiving and sending data according to any known wireless networking protocol now known or later developed (e.g., a Bluetooth transceiver). In some embodiments, it may be beneficial for the operator of the computing device 405 to add one or more virtual network interfaces to the wireless NIC 416, to permit the wireless NIC 416 to send and receive network traffic in userspace (e.g., by unprivileged applications).

The memory 418 may permanently store data related to the computer executable instructions, and may include a random-access memory (RAM) for temporarily storing data related to the computer executable instructions. The memory 418 may be used as an on-device cache, and may buffer data in temporary memory and/or a persistent memory. For example, if the computing device 405 seeks to push data collected from a field environment such as the field environment 122, and a receiver of the data such as the asset management system 68 or the data historian application 73*a* is unable to be reached, or is unable to receive data (e.g., due to a full memory of the receiver of the data), then the computing device 405 may continually write the data to the on-device cache in memory 418 until such time that the data may be later retrieved, received, and/or transmitted. In some embodiments, the cached data may be compressed by the CPU 412, and/or deleted/rotated periodically (e.g., once every hour). Caching is a significant improvement over allowing the data that cannot be transmitted on schedule to be lost. Further, caching is beneficial because at any time, a user may collect data from the computing device 405 relating to the status of the field device 406 (e.g., the time/date of the last calibration) without accessing the field device 406. Caching results in providing users with more timely access to information and less wear and tear on major system components over time. In some configurations, the memory 418 and/or the RAM are implemented using high-density memory technology, such as solid state drive memory, flash memory, semiconductor memory, optical memory, molecular memory, biological memory, or any other suitable high density memory technology. The memory 418 of the computing device 405 may include multiple RAMs. The RAM(s) may be implemented as one or more semiconductor memories, flash memories, magnetically readable memories, optically readable memories, biological memories, and/or other tangible, non-transitory computer-readable storage media, for example.

The computing device 405 includes one or more sets of particular computer executable instructions stored in the memory 418, which may be loaded in to the RAM by the CPU 412 and executed by the CPU 412 to cause certain functions to occur. As such, the computing device 405 is particularly configured at least in part by the particular one or more sets of instructions stored thereon which may include one or more engines, routines, applications, APIs, or programs. A set of applications/modules may be included as part of the one or more sets of instructions stored in the memory 418. The set of applications may be associated with the asset management system 68 and may include the device communication module 420, the security module 422, and/or the protocol module 424, as further discussed herein.

The device communication module 420 may send, receive, and interpret messages. For example, the device communication module 420 may respectively transmit, receive, and/or interpret messages encoded in process control protocols (e.g., Highway Addressable Remote Transducer Protocol, Fieldbus Protocol, Profibus Protocol, or Modbus Protocol) and general purpose computing communication formats (e.g., Bluetooth, WiFi, etc.) via the NIC 416. The device communication module 420 may include instructions that, when executed, bind to one or more sockets of the NIC 416, allowing client applications to connect (e.g., a representational state transfer (REST) API). The device communication module 420 may include computer-executable instructions implementing the API discussed with respect to FIG. 1, which allows a user communicator to send commands to the device communication module 420.

The device communication module 420 may send and receive messages, via the wireless NIC 416, to a network (e.g., a real-time exterior network). For example, the device communication module 420 may send data to, and receive data from, the network 230 of FIG. 2. The device communication module 420 may extract a payload from data received in the computing device 405, and the device communication module 424 may process the payload according to a set of executable instructions.

The security module 422 of computing device 405 may securely mediate the flow of information between device communication module 420 and other modules. The security module 422 may include a set of routines and/or instructions for encrypting and decrypting information, such as asymmetric key encryption algorithms, symmetric key encryption algorithms, or other suitable encryption schemes/ciphers. The security module 422 may be a secure access service, such as an OpenSSH server, which allows users to connect to a shell of an operating system (e.g., Linux) of the computing device 405 that is executing in a module of the computing device 405, and to securely issue commands as an unprivileged and/or privileged user of the operating system, wherein the commands have the effect of changing the state of the computing device 405.

The computing device 405 may include a protocol module 424. The protocol module 424 may be responsible for performing low-level translation, identification, and processing functions with respect to messages encoded in one or another specific process control formatted-data (e.g., DeviceNet). As discussed with respect to FIG. 3, the computing device 405 may be linked to a first wired post (e.g., a no loop 2-wire link, a powered link, a 4-wire link, etc.) of the field device 406. The field device 406 may be similarly linked via a second post of the field device 406 to another field device, the controller 408, etc. In embodiments, the function of the protocol module 424 may be to send and/or receive data to and/or from the field device 406 over the link. For example, data generated by the field device 406 to the computing device 405 may not be capable of being interpreted by, for example, the security module 422 of the computing device 405. Similarly, data generated by the device communication module 420 of the computing device 450 may not be capable of being interpreted by, for example, the field device 406. Therefore, the protocol module 424 may translate data transmitted between the computing device 405 and the field device 406. One or more protocol 424 may be installed in the computing device 405, to allow the computing device 405 to receive and transmit data generated by, and/or destined for, a plurality of different types of field devices.

The protocol module 424 may include a library of routines for translating commands from a user communicator encoded in a general-purpose computing data format to a corresponding message encoded in a process protocol data format, and for encoding responses encoded in a process control data format into a general-purpose computing data format. For example, the protocol module 424 may be able to transform a message in one process control protocol (e.g., Profibus Protocol) to a corresponding message encoded in another process control protocol (e.g., Fieldbus Protocol) and vice versa.

The above-described arrangement of modules for performing the functions of the process plant related to the field communicator are but some possible arrangements. Many other possible arrangements are envisioned.

Figure 5:
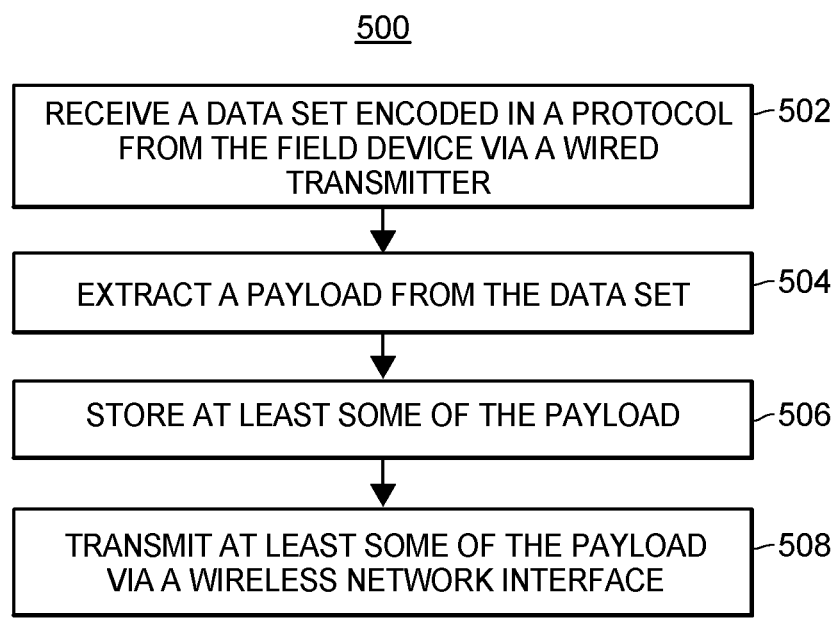
FIG. 5 depicts an example method for field device data collection and protocol conversion.

FIG. 5 depicts a block diagram of an example method 500 for performing protocol conversion in a process plant. The method 500 may include receiving, via a transmitter of the field device, a data set encoded in a process control protocol (block 502). For example, the data set encoded in a process control protocol may be a response to a command issued by a field communicator, from a user communicator. The process control protocol may be any suitable protocol (e.g., HART). The data set may be any suitable data structure, such as a packed array, a hash table, a string, etc. The method 500 may further include extracting, via a processor, a payload from the data set (block 504). The payload may represent the output of a command (e.g., a version number in response to a GetVersion command), data related to sensors in the field device (e.g., a time series of valve states), or other pertinent information sought by a user. The process control protocol may include metadata above and beyond the pertinent information, and extracting the payload may include removing such metadata from the data set encoded in the process control protocol. The extraction step may also include converting data structures/types to a general-purpose computing data format (e.g., transforming a data structure specific to the process control protocol to a list, converting unsigned integers to signed integers, etc.). The method 500 may be implemented using computer-executable instructions in any suitable programming language, and so the precise conversion and extraction steps may differ, depending on the programming language(s) chosen for implementation. The method 500 may further include storing, in a memory, at least some of the payload (block 506). The memory may be a temporary or permanent cache that is accessible by users of the user communicator. The method 500 may further include transmitting at least some of the payload encoded in a general-purpose computing communication protocol via a wireless network interface controller (block 508). The payload (e.g., a time series) may be embedded in a general-purpose computing communication protocol (e.g., HTTP) before being transmitted (e.g., via a POST request) to a remote computing device (e.g., a server device, the user communicator, etc.).

Figure 6:
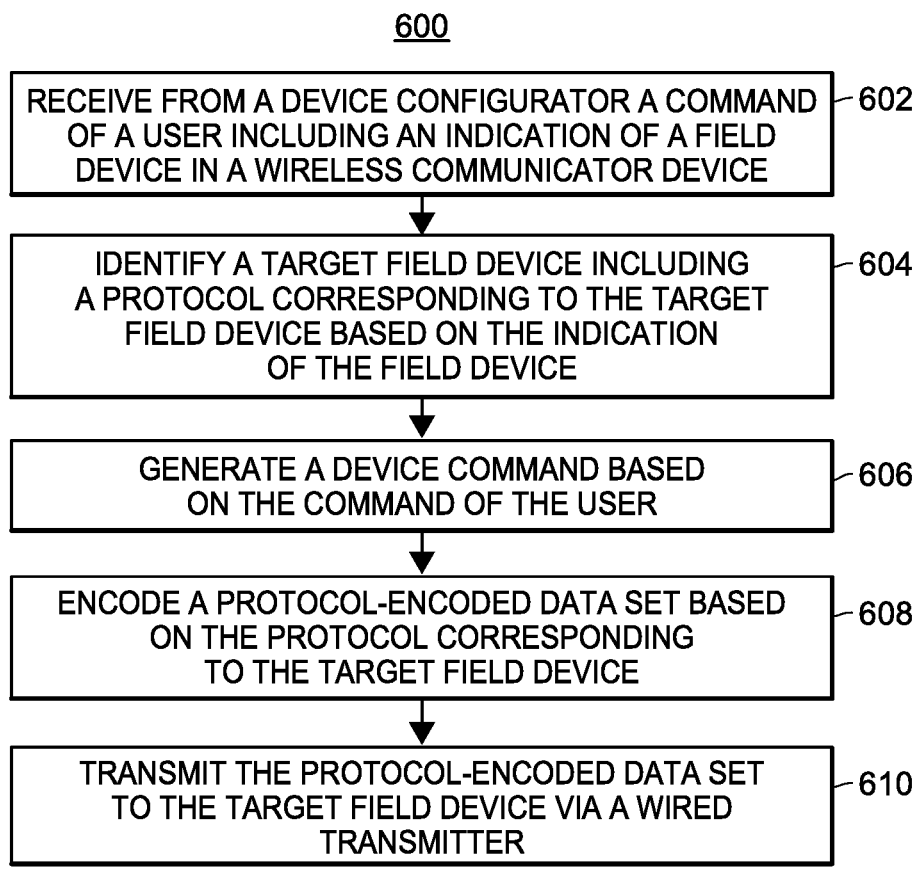
FIG. 6 depicts an example method for accessing a field device.

FIG. 6 depicts a block diagram of an example method 600 for accessing a field device. The method 600 may include receiving, in a field communicator device, a command of a user including an indication of a field device, the command of the user including the indication of the field device received from a user communicator (block 602). The command may be received by an API executing in a memory of the field communicator device. The indication of the field device may be any suitable parameter/identifier (e.g., an integer, a Universally Unique Identifier (UUID), etc.). The method 600 may include identifying, based on the indication of the field device, a target field device including a protocol corresponding to the target field device (block 604). Identifying the target device may include querying one or more field devices coupled to the field communicator device (e.g., via a wired connection) wherein the query includes a GetId command, or similar. Alternately, the memory of the field communicator may include a table of devices by identifier. The method 600 may further include generating, based on the command of the user, a device command (block 606). Generating the device command may include using a library of protocol conversion routines to transform the device command, which may be encoded in a general-purpose computing data format, to a field device protocol format that is compatible with the identified target device. The method 600 may further include encoding, based on the protocol corresponding to the target field device, a protocol-encoded data set (block 608). Once the command is generated, the command may be wrapped in a data set that is transmissible to the identified target device. For example, a particular field device protocol may mandate that a command include a set of headers or other metadata that will be included in the protocol-encoded data set. The method 600 may include transmitting, via a transmitter, the protocol-encoded data set to the target field device (block 610). The transmitter may be a wired transmitter (e.g., 2-wire, 4-wire, etc.) or wireless transmitter, as discussed herein.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a diagnostic tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method for collecting data from a field device and for performing protocol conversion, comprising:
   receiving, in a field communicator via a transmitter of the field device, a data set encoded in a process control protocol;
   serve an application programming interface including routines for adapting user commands to one of plurality of equivalent process control protocols;
   extracting, via a processor, a payload from the data set, wherein the extracting includes converting at least one data structure in the payload from a format of the process control protocol to a format of a general-purpose computing data format;
   storing, in a memory, at least some of the payload; and
   transmitting at least some of the payload encoded in the general-purpose computing communication protocol via a wireless network interface controller.

2. The computer-implemented method of claim 1, wherein the transmitter of the field device includes one or both of (i) a wired transmitter, and (ii) a wireless transmitter.

3. The computer-implemented method of claim 1, wherein the process control protocol includes a HART protocol, a WirelessHART protocol, a Profibus protocol, or a FOUNDATION® Fieldbus protocol.

4. The computer-implemented method of claim 1, wherein receiving the protocol-encoded data set from the field device includes retrieving the protocol-encoded data set from the field device.

5. The computer-implemented method of claim 4, wherein retrieving the protocol-encoded data set from the field device includes polling the field device.

6. The computer-implemented method of claim 1, wherein retrieving the protocol-encoded data set from the field device includes generating a data retrieval command encoded in the process control protocol.

7. The computer-implemented method of claim 1, wherein the general-purpose computing communication protocol is an IEEE 802.11 protocol, a Bluetooth protocol, a Bluetooth Low Energy protocol, a Long Range protocol, and/or a mobile telephony protocol.

8. The computer-implemented method of claim 1, wherein transmitting the at least some of the payload includes transmitting the at least some of the payload to a user communicator.

9. The computer-implemented method of claim 1, wherein transmitting the at least some of the payload includes transmitting the at least some of the payload in real-time.

10. The computer-implemented method of claim 1, wherein transmitting the at least some of the payload includes transmitting the at least some of the payload to a remote asset management system.

11. The computer-implemented method of claim 10, wherein transmitting the at least some of the payload to a remote asset management system includes transmitting the at least some of the payload via a wireless gateway.

12. The computer-implemented method of claim 10, wherein transmitting the at least some of the payload to a remote asset management system includes transmitting the at least some of the payload via a wireless mesh network.

13. The computer-implemented method of claim 1, further comprising:
transmitting, one or both of (i) a calibration command, and (b) a configuration command to the field device.

14. The computer-implemented method of claim 1, further comprising:
analyzing, via the processor, the payload to diagnose a problem relating to the field device.

15. A computer-implemented method of accessing a field device, comprising:
receiving, in a field communicator device, a command of a user including an indication of a field device, the command of the user including the indication of the field device received from a user communicator;
identifying, based on the indication of the field device, a target field device including a protocol corresponding to the target field device;
serving an application programming interface including routines for adapting user commands to one of plurality of equivalent process control protocols;
generating, based on the command of the user, a device command;
encoding, based on the protocol corresponding to the target field device, a protocol-encoded data set; and
transmitting, via a transmitter, the protocol-encoded data set to the target field device.

16. The computer-implemented method of claim 15, wherein the command of the user is a configuration command, a diagnostic command, a maintenance command, or a calibration command.

17. A field communicator device comprising:
one or more processors;
a transmitter;
a wireless network interface controller; and
a memory storing instructions that, when executed by the one or more processors, cause the field communicator device to:
retrieve, in the field communicator via the transmitter, data encoded in a field device transmission protocol;
serve an application programming interface including routines for adapting user commands to one of plurality of equivalent process control protocols;
interpret, in a device communication module of the wireless communication device, the data by converting at least one data structure in a payload of the data from a format of the field device transmission protocol to a format of a general-purpose computing data format;
store, in the memory, at least some of the data; and
transmit, via the wireless network interface controller, at least some of the data.

18. The field communicator device of claim 17, wherein the field device transmission protocol is Highway Addressable Remote Transducer Protocol, Fieldbus Protocol, Profibus Protocol, or Modbus Protocol.

19. The field communicator device of claim 17, wherein the wireless network interface controller is an IEEE 802.11 transmitter, a Bluetooth transmitter, a Bluetooth Low Energy transmitter, a Long Range transmitter, and/or a mobile telephony transmitter.

20. The field communicator device of claim 17, the memory storing further instructions that, when executed, cause the field communicator device to:
receive, via the wireless network interface controller, a command of a user communicator; and
based on the command of the user communicator, issue an instruction to a field device via the transmitter.

21. A computing system for providing data collection and protocol conversion to enable field devices to wirelessly communicate with asset management tools and systems, comprising:
a wireless computer network;
a wireless user communicator; and
a field communicator comprising one or more processors, a transmitter, a wireless network interface controller, and a memory storing instructions that, when executed by the one or more processors, cause the computing system to:
transmit, via the wireless computer network, data encoded in a general-purpose computing communication protocol;
serve an application programming interface including routines for adapting user commands to one of plurality of equivalent process control protocols;
receive, via the wireless computer network, the data;
interpret, in the field communicator, the data to generate a data payload encoded in a process control protocol by converting at least one data structure in the data payload from a format of a general-purpose computing data format to a format of the process control protocol; and
issue an instruction to a field device including the data payload.

22. The computing system of claim 21, wherein the application programming interface adapts two or more user commands in parallel.

* * * * *

UNITED STATES PATENT AND TRADEMARK OFFICE
CERTIFICATE OF CORRECTION

PATENT NO. : 12,316,722 B2
APPLICATION NO. : 16/587653
DATED : May 27, 2025
INVENTOR(S) : David R. Denison et al.

Page 1 of 1

It is certified that error appears in the above-identified patent and that said Letters Patent is hereby corrected as shown below:

In the Specification

At Column 5, Line 30, "Hyper Text" should be -- Hypertext --.

At Column 8, Line 59, "(ROM)" should be -- (ROM). --.

At Column 20, Line 21, "in to" should be -- into --.

In the Claims

At Column 25, Line 40, "(b)" should be -- (ii) --.

Signed and Sealed this
Third Day of February, 2026

John A. Squires
*Director of the United States Patent and Trademark Office*